United States Patent
Shakespeare et al.

(10) Patent No.: US 9,858,321 B2
(45) Date of Patent: Jan. 2, 2018

(54) ACCESSING APPLICATION SERVICES FROM FORMS

(71) Applicant: Oracle International Corporation, Redwood Shores, CA (US)

(72) Inventors: Darryl Martin Shakespeare, Denver, CO (US); David Wayne Nowakowski, Thornton, CO (US); Nicole Jodie Laurent, Lakewood, CO (US)

(73) Assignee: Oracle International Corporation, Redwood Shores, CA (US)

( * ) Notice: Subject to any disclaimer, the term of this patent is extended or adjusted under 35 U.S.C. 154(b) by 614 days.

(21) Appl. No.: 14/463,532

(22) Filed: Aug. 19, 2014

(65) Prior Publication Data

US 2015/0088866 A1 Mar. 26, 2015

Related U.S. Application Data

(60) Provisional application No. 61/880,828, filed on Sep. 20, 2013, provisional application No. 61/880,830, filed on Sep. 20, 2013.

(51) Int. Cl.
   *G06F 17/30* (2006.01)

(52) U.S. Cl.
   CPC .................. *G06F 17/3056* (2013.01)

(58) Field of Classification Search
   CPC .................................................. G06F 17/3056
   See application file for complete search history.

(56) References Cited

U.S. PATENT DOCUMENTS

| 7,793,255 | B1 | 9/2010 | Kawaguchi |
| 7,933,221 | B1 | 4/2011 | Pawar et al. |
| 8,261,231 | B1 | 9/2012 | Hirsch et al. |
| 8,352,903 | B1 | 1/2013 | Friedman |
| 2002/0069157 | A1 | 6/2002 | Jordan |
| 2003/0115548 | A1 | 6/2003 | Melgar |
| 2005/0028157 | A1 | 2/2005 | Betancourt et al. |
| 2006/0075070 | A1 | 4/2006 | Merissert-Coffinieres |
| 2006/0085824 | A1 | 4/2006 | Bruck et al. |

(Continued)

OTHER PUBLICATIONS

Notice of Allowance and Fee(s) due dated Oct. 25, 2016 for U.S. Appl. No. 14/179,548.

(Continued)

*Primary Examiner* — Etienne Leroux
*Assistant Examiner* — Dara J Glasser
(74) *Attorney, Agent, or Firm* — Vista IP Law Group, LLP

(57) ABSTRACT

A method, system, and computer program product for computer-aided deployment of mobile system apps for accessing enterprise applications. A form field service request originates from a non-native system. The service request comprises at least one form field identifier. The native computer system processes the service request using the form field identifier to identify corresponding forms stored at locations accessible to the native system (e.g., in a database engine). The native computer system processes the service request to map the form field to business logic operations and/or to other actions before delivering the service request to a native application that is configured to process the form field using native business logic. The business logic within the native application produces results from the native application which in turn are sent from the native application to the non-native system. The non-native system comprises any number of mobile devices, smart phones, and/or tablet devices.

20 Claims, 8 Drawing Sheets

(56) References Cited

U.S. PATENT DOCUMENTS

| | | |
|---|---|---|
| 2006/0212537 A1 | 9/2006 | Hans et al. |
| 2006/0277231 A1 | 12/2006 | Kral |
| 2007/0168489 A1 | 7/2007 | Kwon |
| 2009/0193393 A1 | 7/2009 | Baldwin et al. |
| 2009/0259990 A1 | 10/2009 | Olsson et al. |
| 2010/0083281 A1 | 4/2010 | Malladi et al. |
| 2010/0180328 A1 | 7/2010 | Moas et al. |
| 2010/0216434 A1 | 8/2010 | Marcellino et al. |
| 2011/0131567 A1 | 6/2011 | Tirk et al. |
| 2011/0177803 A1 | 7/2011 | Hans et al. |
| 2012/0036494 A1 | 2/2012 | Gurumohan |
| 2012/0173615 A1* | 7/2012 | Greer ............... H04L 67/2823 709/203 |
| 2012/0245918 A1 | 9/2012 | Overton et al. |
| 2013/0019314 A1 | 1/2013 | Ji |
| 2013/0110547 A1* | 5/2013 | Englund ............ G06F 19/322 705/3 |
| 2013/0205305 A1 | 8/2013 | Lv |
| 2013/0238456 A1 | 9/2013 | Soysa et al. |
| 2013/0239086 A1 | 9/2013 | Brendza et al. |
| 2014/0075347 A1 | 3/2014 | Banerjee |
| 2014/0281886 A1 | 9/2014 | Hirsch |
| 2014/0282371 A1 | 9/2014 | Hirsch |
| 2014/0351684 A1 | 11/2014 | Smit |
| 2015/0050922 A1 | 2/2015 | Ramalingam |
| 2016/0085520 A1 | 3/2016 | Zhao |

OTHER PUBLICATIONS

Extended European Search Report Aug. 9, 2016 for the corresponding/related EP Patent Application No. 14845448.1, 8 pages.

Final Office Action dated Sep. 21, 2016 for U.S. Appl. No. 14/463,179.

Argo, "Documentation", Sep. 22, 2012, 4 pages, url: http://argo.sourceforge.net/documentation.html.

International Search Report and Written Opinion dated Dec. 30, 2014, for related PCT Application No. PCT/US2014/056677, 9 pages.

Non-final Office Action dated Mar. 12, 2015 for U.S. Appl. No. 14/463,179.

Non-final Office Action dated Jan. 13, 2015 for U.S. Appl. No. 14/179,548.

Non-final Office Action dated Nov. 6, 2015, for U.S. Appl. No. 14/179,548.

Final Office Action dated Jul. 2, 2015 for U.S. Appl. No. 14/179,548.

Final Office Action dated Aug. 13, 2015 for U.S. Appl. No. 14/463,179.

Non-final Office Action dated Mar. 10, 2016, for U.S. Appl. No. 14/463,179.

Final Office Action dated Jun. 9, 2016 for U.S. Appl. No. 14/179,548.

Aziz, et al., "An Introduction to JavaScript Object Notation (JSON) in JavaScript and .Net" Feb. 2007, <msdn.microsoft.com/en-us/library/bb299886.aspx#intro_to_json_topic3>.

Non-final Office Action dated Apr. 17, 2017 for U.S. Appl. No. 14/463,179.

Final Office Action dated Sep. 21, 2017 for related U.S. Appl. No. 14/463,179.

* cited by examiner

ACCESSING APPLICATION SERVICES FROM FORMS

RELATED APPLICATIONS

The present application claims the benefit of priority to U.S. Patent Application Ser. No. 61/880,828, entitled "PERFORMING FORM-ORIENTED OPERATIONS FROM AN EXTERNAL SYSTEM", filed Sep. 20, 2013, and the present application claims the benefit of priority to U.S. Patent Application Ser. No. 61/880,830, entitled "DEVELOPMENT OF NATIVE MOBILE APPLICATION CODE", filed Sep. 20, 2013; both of which are hereby incorporated by reference in their entirety.

The present application is related to U.S. patent application Ser. No. 14/463,179, entitled "COMPUTER-AIDED DEVELOPMENT OF NATIVE MOBILE APPLICATION CODE", filed on even date herewith, which is hereby incorporated by reference in its entirety.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD

The disclosure relates to the field of computer-aided deployment of mobile system apps for accessing enterprise applications, and more particularly to techniques for accessing middleware application services from forms.

BACKGROUND

Business applications have long been available on desktops, either as an application running natively on the desktop or as an application user interface that communicates with back-end logic (e.g., in a client server model). As the demand increases for more and more applications being available from a non-native terminal (e.g., from mobile devices, or in a computer-to-computer protocol), the cost of porting user interfaces from a native desktop setting to an external system also increases.

Legacy approaches have entailed time consuming tasks of creating or retargeting (e.g., porting) significant portions of business logic in order to provide access to that logic (e.g., via services) and to enable a non-native system to perform "create", "read", "update" and "delete" (CRUD) operations against the back-end business logic.

Some approaches for generating and maintaining enterprise applications (e.g., desktop applications) have relied on a "forms-based" approach to interaction with a user. For example, a form is defined to serve as a container for various fields, which fields map to the back-end logic and/or database schema.

What is needed is an approach where each field in the form can be hosted by a mobile terminal app or external system application where the operations corresponding to the form fields can be processed (e.g., as a service) before reaching the back-end business logic. The input/output characteristics and certain other operations corresponding to the form fields can be emulated such that processed back-end business logic can remain agnostic as to the source of the CRUD operation, thus facilitating access to the back-end application from a non-native system.

What is needed is a technique or techniques where services can be called from an external system and yet access the business logic in the back end. None of the aforementioned legacy approaches achieve the capabilities of the herein-disclosed techniques, therefore, there is a need for improvements.

SUMMARY

The present disclosure provides an improved method, system, and computer program product suited to address the aforementioned issues with legacy approaches. More specifically, the present disclosure provides a detailed description of techniques used in methods, systems, and computer program products for using middleware application services to process forms for accessing back-end business logic.

Some embodiments commence upon the event of a form field service request originating from a non-native system, which is then received at a native computer system. Such a service request comprises a form field identifier. The native computer system processes the service request using the form field identifier to further identify a form stored at a location accessible to the native system (e.g., in a database engine). The native computer system processes the service request to map the form field to business logic operations and/or other actions before delivering the service request to a native application that is configured to process the form field using native business logic. The business logic within the native application produces results from the native application which in turn are sent from the native application to the non-native system. The non-native system comprises one of a mobile device, a smart phone, and a tablet. The non-native system is configured to communicate with a middleware component situated logically between the non-native system and the business logic.

Further details of aspects, objectives, and advantages of the disclosure are described below and in the detailed description, drawings, and claims. Both the foregoing general description of the background and the following detailed description are exemplary and explanatory, and are not intended to be limiting as to the scope of the claims.

DETAILED DESCRIPTION

Figure 1A:
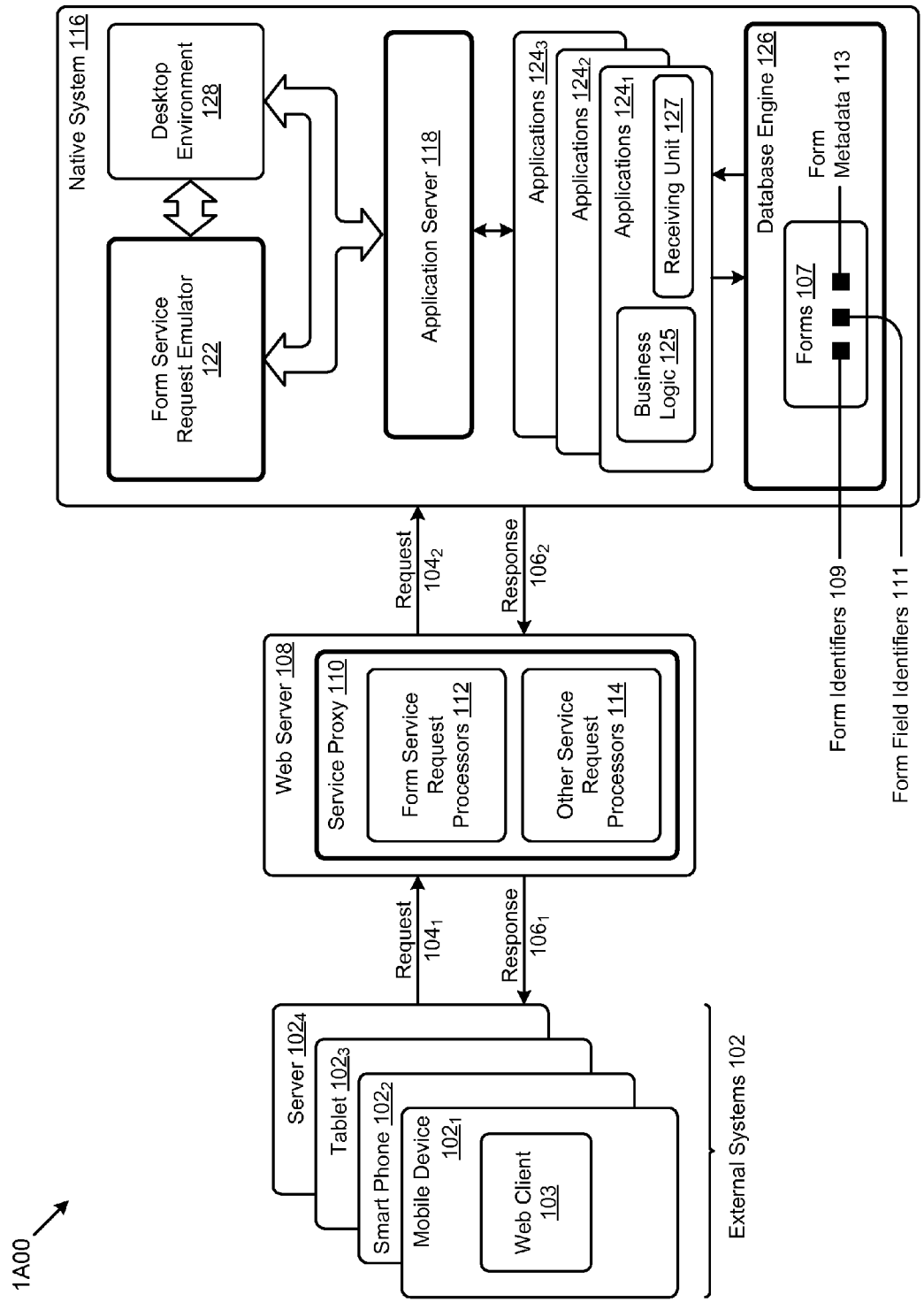
FIG. 1A depicts an environment for hosting middleware application services generated from forms as used to access back-end business logic, according to some embodiments.

Disclosed herein and in the accompanying figures are exemplary environments, methods, and systems for accessing middleware application services from forms used to access back-end business logic.

Overview

Business applications have long been available on desktops, either as an application running natively on the desktop, or as an application user interface that communicates with long-established back-end logic (e.g., in a client server model). As the demand increases for more and more applications being available from a non-native terminal (e.g., from mobile devices, or in a computer-to-computer protocol), the cost of porting user interfaces from a native desktop setting to an external system also increases.

Legacy approaches have entailed time consuming development work to create or retarget (e.g., porting) significant portions of business logic in order to provide access to that logic (e.g., via services) and to enable a non-native system to perform "create", "read", "update" and "delete" (CRUD) operations against the back-end business logic.

The herein-disclosed approach reduces or eliminates development work associated with using a form as a specification of the needed services. The form, together with metadata (e.g., user-supplied metadata), often satisfies the data requirements operations processed in the back-end business logic. Such a capability to use pre-existing forms from an external system would reduce or eliminate the need to port or rewrite major pieces of business logic merely to run the application from a non-native terminal.

Strictly as an introduction, embodiments as disclosed herein operate by exposing services to allow a service call (e.g., as a REST-based service call or a SOAP-based service call) via an HTTP POST or other method.

Some embodiments facilitate the user to specify the any of: user credentials, an application name, an application version, a form name, a field name, a field value, and an operation to perform (e.g., a CRUD action).

Some of the embodiments of this disclosure are configured to receive the foregoing parameters and use them (e.g., via a generated service) to execute the corresponding application in a "silent mode" or in a "headless mode" (e.g., where the application is executed at a server configured to operate without a display monitor). In exemplary embodiments, the requested operation from the external system is performed by the application in a silent mode or headless mode as if a user had requested the operation from the native system.

After receiving the requested operation (e.g., via a service request), and at some moment after the requested operation has been initiated, a "post dialog" is initiated to raise a post event. This post event is raised sometime after the operation is initiated via the respective generated service. A developer can use this event to perform post-operation logic as may be needed to meet CRUD operation requirements, even though the service request was generated from an external system, and even though the application may be running on a headless server. For example, after a requested operation is initiated, and/or after a requested operation has completed at least a portion of the processing of the requested operation, the application might seek user confirmation. In the situation where the application server is attached to a display (e.g., within desktop environment 128), the user might click the "OK" button to approve and/or save the transaction. In a headless environment, the aforementioned post dialog is initiated to obtain user confirmation from the external system (e.g., from a mobile device $102_1$, from a smart phone $102_2$, from a tablet $102_3$, from a phablet, etc.). In some embodiments a post dialog is wrapped by a logic container included in the event model. Such a logic container allows a developer to specify post dialog code that executes when the application is invoked from an external system (e.g., though the form service interface). Examples of such post dialog code could include logic such as logic to provide for data filtering and/or formatting that comports to specific requirements for the external system to receive and consume results issuing from execution of the service request. Or such post dialog code could include logic to provide for data filtering and/or formatting that comports to specific requirements for a web client 103 to receive and consume results issuing from execution of the service request. Or such post dialog code could include logic for retrieval of information or data based on the results issuing from execution of the service request and/or logic for processing the retrieved information.

Some embodiments rely in part on middleware and middleware access methods or protocols. For example, a JAS server can implement portions of SOAP or REST. In such an embodiment, once the service has been completed, the JAS server returns data from the operation (if any) to the external system. In some cases the data is returned in a JSON format.

The drawings and descriptions hereunder describe how an external system can use the form-based services (e.g., in a multi-tier environment having a native system, middleware, and one or more external systems).

Definitions

Some of the terms used in this description are defined below for easy reference. The presented terms and their respective definitions are not rigidly restricted to these definitions—a term may be further defined by the term's use within this disclosure. The term "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. As used in this application and the appended claims, the term "or" is intended to mean an inclusive "or" rather than an exclusive "or". That is, unless specified otherwise, or is clear from the context, "X employs A or B" is intended to mean any of the natural inclusive permutations. That is, if X employs A, X employs B, or X employs both A and B, then "X employs A or B" is satisfied under any of the foregoing instances. The articles "a" and "an" as used in this application and the appended claims should generally be construed to mean "one or more" unless specified otherwise or is clear from the context to be directed to a singular form.

Reference is now made in detail to certain embodiments. The disclosed embodiments are not intended to be limiting of the claims.

Descriptions of Exemplary Embodiments

FIG. 1A depicts an environment 1A00 for hosting middleware application services generated from forms as used to access back-end business logic.

As shown, external systems 102 (e.g., a mobile device $102_1$, a smart phone $102_2$, a tablet $102_3$, a phablet, a server $102_4$, etc.) can communicate with a middleware components (e.g., such as a web server 108, or such as a service proxy 110) via requests $104_1$ and responses $106_1$ over SOAP, REST, and/or other methods or protocols. The mobile device $102_1$, a smart phone $102_2$, a tablet $102_3$, a phablet, a server $102_4$, etc. host a web client 103.

The shown web server 108 can comprise a service proxy 110. The service proxy can further comprise of any of a variety of form service request processors 112 and other service request processors 114. Requests from the external systems 102 can be processed by the request processors (e.g., form service request processor 112, and/or other request processor 114, etc.). The service proxy can send any number of requests $104_2$ to the native system 116 (e.g., to reach any pre-processors or support processes). Such pre-processors or support processes can be implemented by or in a Java application server (e.g., see FIG. 1B) or other process configured to receive the aforementioned requests. The service proxy can receive any number of responses $106_2$ from the native system. In some cases the responses $106_2$ are formatted as one or more instances of a JSON message.

As shown, the native system 116 comprises a variety of processes, virtual servers, desktop environments 128, applications 124, and databases and/or database engines 126.

The shown application server 118 (e.g., an application server, etc.) can host any number of applications (e.g., applications 124) and/or any number services (e.g., form services, etc.) and can host any number of form service request emulators 122. The services can receive any number of requests $104_2$ (e.g., a request for a form application, etc.). Received requests can be processed by any number of form service request emulators. Strictly as one example, an instance of a form service request emulator can receive a request (e.g., request $104_2$) as originated from a non-native system (e.g., see external systems 102) in the form of a URI post, and modify the received URI post to so as to comport with a format or formats as are used by the application server and/or applications.

The form service request emulators can communicate with application server 118, and/or the applications 124, and any application (e.g., application $124_1$, application $124_2$, application $124_3$, etc.) can implement business logic 125, and any application can comprise a sending unit 127 and any number of modules (e.g., application modules) to perform processing of forms. In the embodiment shown, such communications are be performed in a "silent mode" in which mode the native application modules do not perform logging of messages or otherwise interact with the desktop environment 128.

The shown desktop environment 128 (e.g., a workstation, a laptop, etc.) can communicate with any of the applications 124. The shown applications can communicate with a database engine 126, and the database engine 126 can hold forms 107 and form metadata 113. Forms and form metadata can be stored and/or cached in one or more locations accessible to the native system. Form metadata 113 can include or be stored with one or more form identifiers 109, which identifiers serve to uniquely name a form. Some exemplary uses of form identifiers 109 include identification of any aspects of form, including identification of form fields, for example, using form field identifiers 111.

The aforementioned form service request emulators 122 extend the function of the services provided by the application server 118. In some situations, the services within the application server might be configured to act in one or more roles and/or to provide a preconfigured set of services. In some embodiments, the form service request emulators 122 extend the functions of the preconfigured set of services, for example, by providing a security interface and/or by handling any protocols implemented within a web client based applet or application. A series of requests 104 (e.g., as initiated by an external system) and responses 106 (e.g., to be received by an external system) can be handled either by services within the application server 118, or by a form service request emulator 122, or by both. The form service request emulator 122 exposes an additional way to interact with the applications 124 that extends the facilities or services provided by the application server 118. In many cases, implementation of such extended services and/or extended facilities, including functions of the form service request emulator 122 offer a range of facilities that are more flexible, accessible and extensible as compared to a web client interface.

Figure 1B:
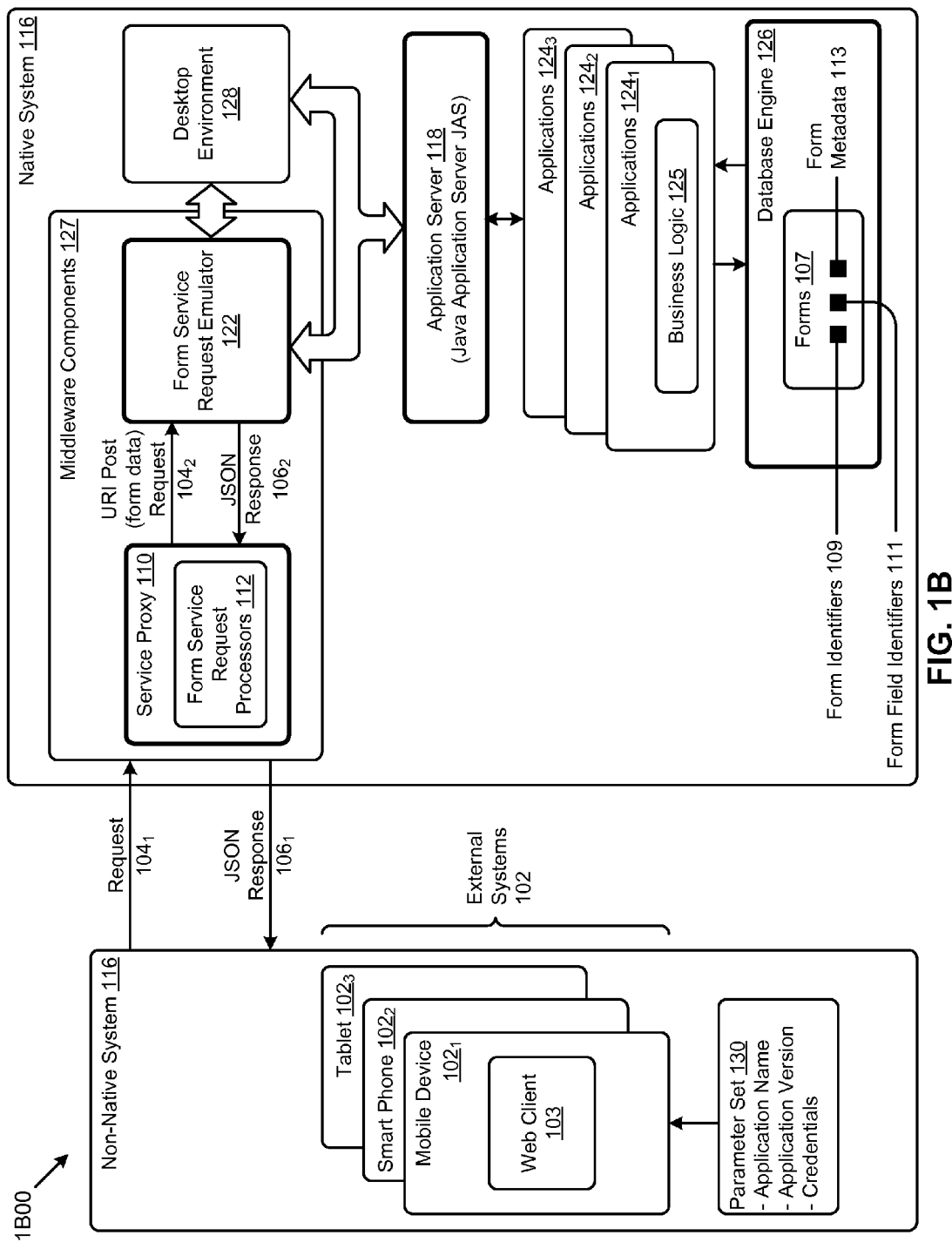
FIG. 1B depicts a Java-oriented environment for hosting middleware emulation services generated from forms as used to access back-end business logic, according to some embodiments.

One such server platform is a Java application server, which is shown and discussed as pertaining to the following FIG. 1B.

FIG. 1B depicts a Java-oriented environment 1B00 for hosting middleware emulation services generated from forms 107 as used to access back-end business logic.

As shown, the native system 116 can comprise of any of a variety of application servers such as the shown Java application server (JAS), applications 124, and database engines 126.

External system 102 can communicate with the native system 116. The external system can send a service request (e.g., request $104_1$) in the form of a post payload, and any of the middleware components can in turn issue a request $104_2$ in the form of a URL post with the form data payload (e.g., using an http post request, using an http get request, etc.). The form service request emulator 122 can receive the request $104_2$ and process the service request. In this embodiment, middleware components process responses from the native system application or applications, and forwards response $106_2$ in the form of a JSON message (e.g., to contain the results of processing a service call) to the requestor. As such, the external system can receive a response $106_1$ in the form of a JSON message from the middleware components.

A parameter set 130 can comprise any number of a variety of values, including user-supplied data. The shown sample user-supplied metadata parameter set comprises an application name, an application version (e.g., a version number), and a user credential (e.g., a user name, a password, etc.). In some cases additional parameters are included in the parameter set 130.

A parameter set 130 can comprise data such as the data to be sent to the business logic and/or can comprise references to operations to be performed when the form runs (e.g., set name_field="Joe", then set title_field="manager", then "press ok").

The foregoing format (e.g., <"fieldname"="\value">) is merely one example for passing a setting for parameter set 130. Reasonable formats have many variations. For example, one embodiment passes parameters into an application using interfaces exposed by the application. Other possibilities include formats to specify execution of "create", "read", "update" and "delete" operations by the back-end business logic behavior. In other embodiments, the parameter set interface allows for data values to be passed for assignment to any data field that is exposed by the form. In yet other embodiments the parameter set interface allows for flow control of the process, and/or for performing any action or series of actions that is or can be exposed by a web client 103. For example, passing a series of settings for parameter set 130 can include a series of actions (e.g., S1, S2, . . . SN) such as:

S1: Put <"ValueA" in field "X">
S2: Put <"ValueB" in field "Y">
S3: Press <any button>
S4: Put <"ValueB" in field "Y">
S5: Press <button B>
S6: Return <status based on current state of the application>
SN: <additional action(s)>.

Figure 2:
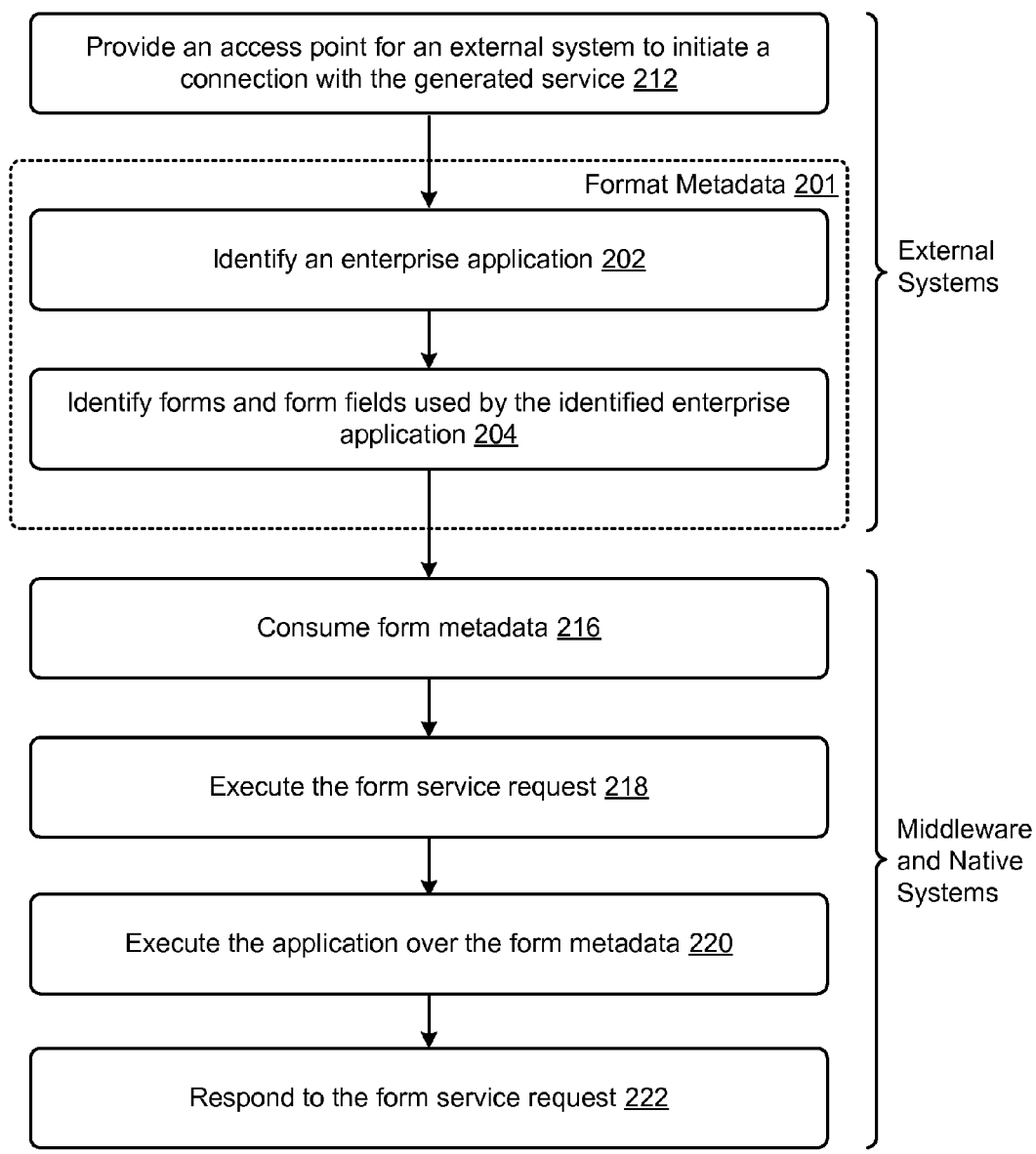
FIG. 2 is a flow chart of a subsystem for accessing middleware application services, according to some embodiments.

FIG. 2 is a flow chart of a subsystem 200 for accessing middleware application services. As an option, one or more instances of subsystem 200 or any aspect thereof may be implemented in the context of the architecture and functionality of the embodiments described herein. Also, the subsystem 200 or any aspect thereof may be implemented in any desired environment.

As shown, the flow chart defines a sequence of operations for accessing one or more middleware application services from forms 107, the operations comprising: providing an access point (e.g., an initial URI) for an external system to initiate a connection with a generated service (see operation 212), then formatting user-supplied metadata into a request payload (see partition 201). As shown, the metadata can comprise the name of an application (e.g., see operation 202), and may further comprise an identification of a form used by the application (e.g., see operation 204). The foregoing steps can be performed by an external system and/or its agents.

The flow continues, and a middleware component and/or native system consumes metadata (see operation 216), executes the form service request (see operation 218), executes the application using the form data and metadata 220, and responds to the form service request (see operation 222) with the response as given by the identified application.

Figure 3:
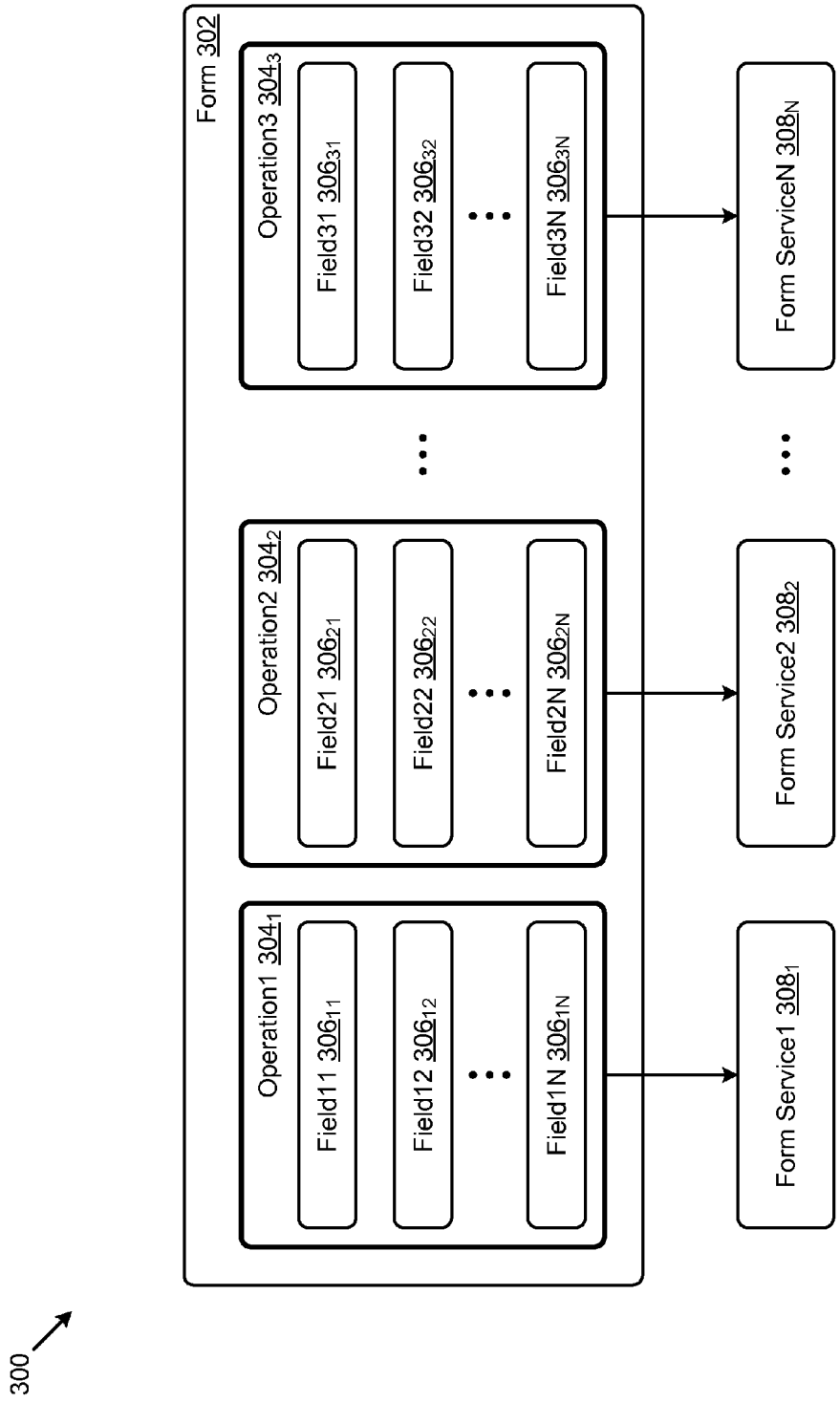
FIG. 3 is a relationship diagram to show relationships between forms and services as used in systems for accessing middleware application services from forms for accessing back-end business logic, according to some embodiments.

FIG. 3 is a relationship diagram 300 to show relationships between forms 107 and services as used in systems for accessing middleware application services from forms for accessing back-end business logic. The relationship diagram 300 or any aspect thereof may be implemented in any desired environment.

As shown, form 302 (e.g., a payroll form, an accounts payable form, etc.) can comprise of any number or variety of operations 304 (e.g., operation $304_1$, operation $304_2$, operation $304_3$, etc.) and fields 306 (e.g., field $306_{11}$, field $306_{12}$, field $306_{22}$, field $306_3N$, etc.). The operations may refer to a create operation, a read operation, an update operation, a delete operation, etc. and can have any number of associated fields (e.g., a field representing a name, a date, an address, etc.). An operation and its associated field or fields can map to a service (e.g., form service $308_1$, form service $308_2$, form service $308_N$, etc.). A form can have any number of operations and an operation can map to any number of services.

Figure 4:
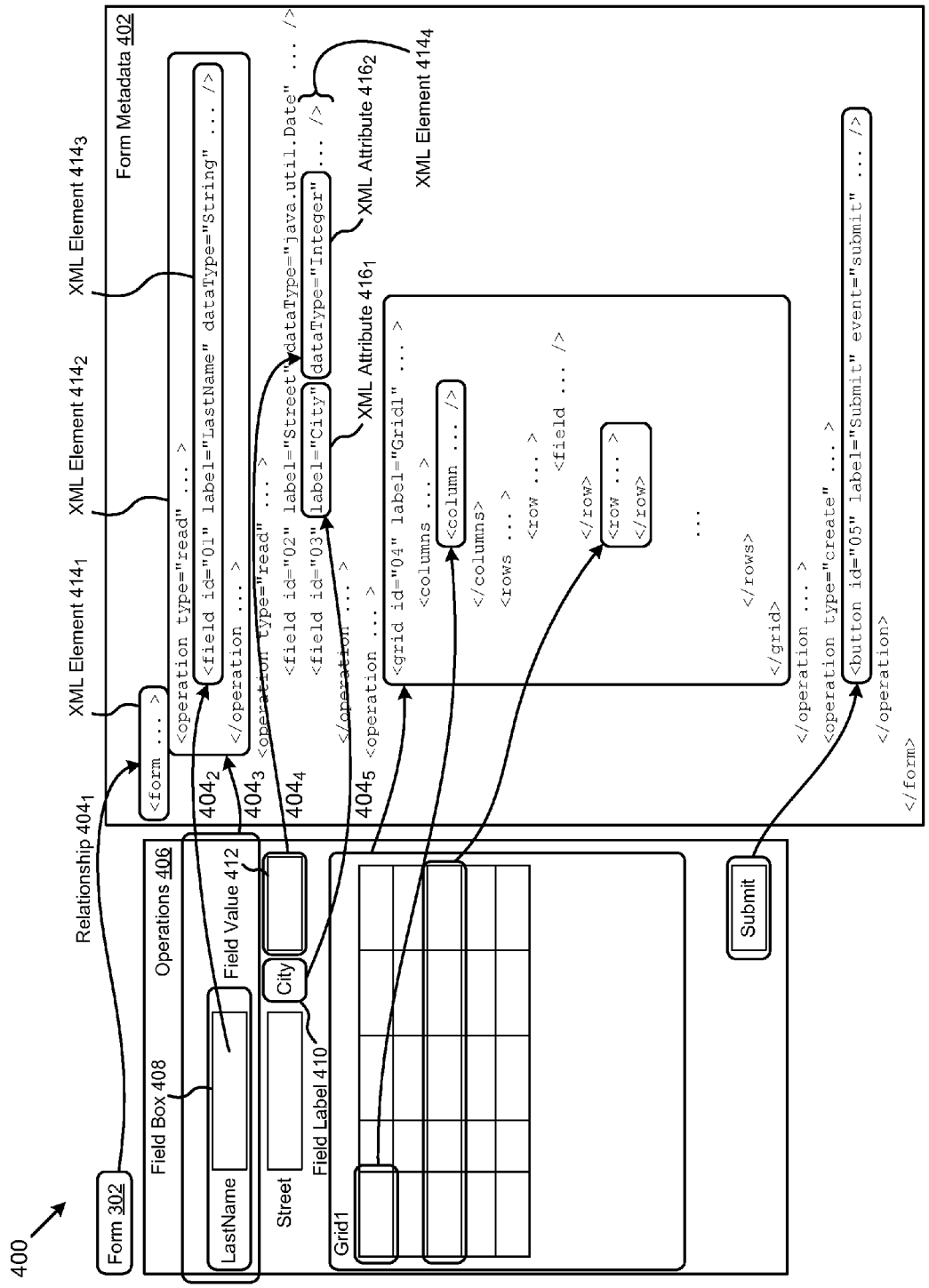
FIG. 4 is a mapping to illustrate relationships between forms and form metadata for accessing middleware application services from forms for accessing back-end business logic, according to some embodiments.

FIG. 4 is a mapping 400 to illustrate relationships between forms 107 and form metadata 402 for accessing middleware application services from forms for accessing back-end business logic. The mapping 400 or any aspect thereof may be implemented in any desired environment.

As shown, mapping 400 can define any number of relationships 404 between form 302 and any instances of form metadata $404_1$ thru $404_5$, which form metadata can be codified using any known technique (e.g., using XML, using BNF, etc.). Strictly as an illustrative example, the form metadata $404_1$ thru $404_5$ can be comprised of XML elements that correspond to respective form components (e.g., operations, fields, grids, buttons, etc.). Form metadata can describe the structure and any other aspects of a form and/or its components.

As shown, a relationship $404_1$ maps the form 302 to an XML element $414_1$. Operations 406 can have any number of associated instances of fields. Relationship $404_3$ maps the operation 406 to an XML element $414_2$. The XML element $414_2$ can comprise of any number of a variety of attributes (e.g., type, etc.). A relationship $404_2$ can map the field given in field box 408 to an XML element $414_3$. The XML element $414_3$ can comprise any number of a variety of attributes (e.g., id, label, data type, etc.). A relationship $404_5$ can map a field label 410 (e.g., city, etc.) to an XML attribute $416_1$ (e.g., label, etc.). A relationship $404_4$ can map a field value 412 to an XML attribute $416_2$ (e.g., data type, etc.) using the shown XML field element $414_4$.

The foregoing is merely one implementation, and other embodiments might directly produce maps in JSON formats rather than in XML formats. In some cases, the relationships 404 include maps to/from operations 406 using a data structure or a hardcoded map. Runtime processes identify the form that is running (e.g., via a form identifier, or via an inference) and, based on the components used in the identified form (e.g., a date field, a drop down, grid rows, etc.), produces a JSON representation of that form.

Further details regarding a general approach to using JSON representations are described in U.S. application Ser. No. 14/179,548 , entitled "RULE-BASED AUTOMATIC CLASS GENERATION FROM A JSON MESSAGE", which is hereby incorporated by reference in its entirety.

Figure 5:
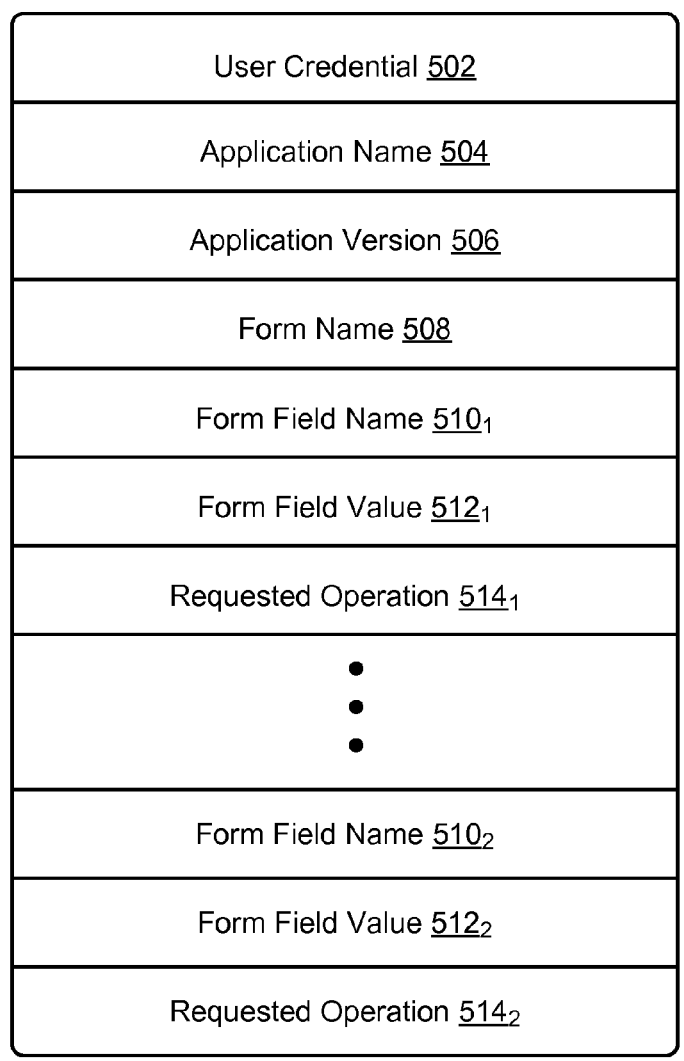
FIG. 5 depicts a sample user-metadata parameter set as used for accessing middleware services, according to some embodiments.

FIG. 5 depicts a sample user-supplied metadata parameter set 500 as used for accessing middleware services.

A metadata parameter set can comprise any number of a variety of values, including user-supplied data. The shown sample user-supplied metadata parameter set comprises a user credential 502 (e.g., a user name, a password, etc.), an application name 504 (e.g., payroll, accounts billable, etc.), an application version 506 (e.g., v1.2.304), a form name 508, a form field name $510_1$, a form field value $512_1$, and a requested operation $514_1$ (e.g., create, read, update, delete, etc.). In some cases additional fields, field values, and operations are sent (e.g., an additional form field name $510_2$, an additional form field value $512_2$, and an additional requested operation $514_2$).

A parameter set such as sample user-supplied metadata parameter set 500 can be sent to middleware and forwarded to the native system using any known communication method, including sending as a request to middleware (e.g., see request $104_1$) or as a request to the native system (e.g., see $104_2$).

Figure 6:
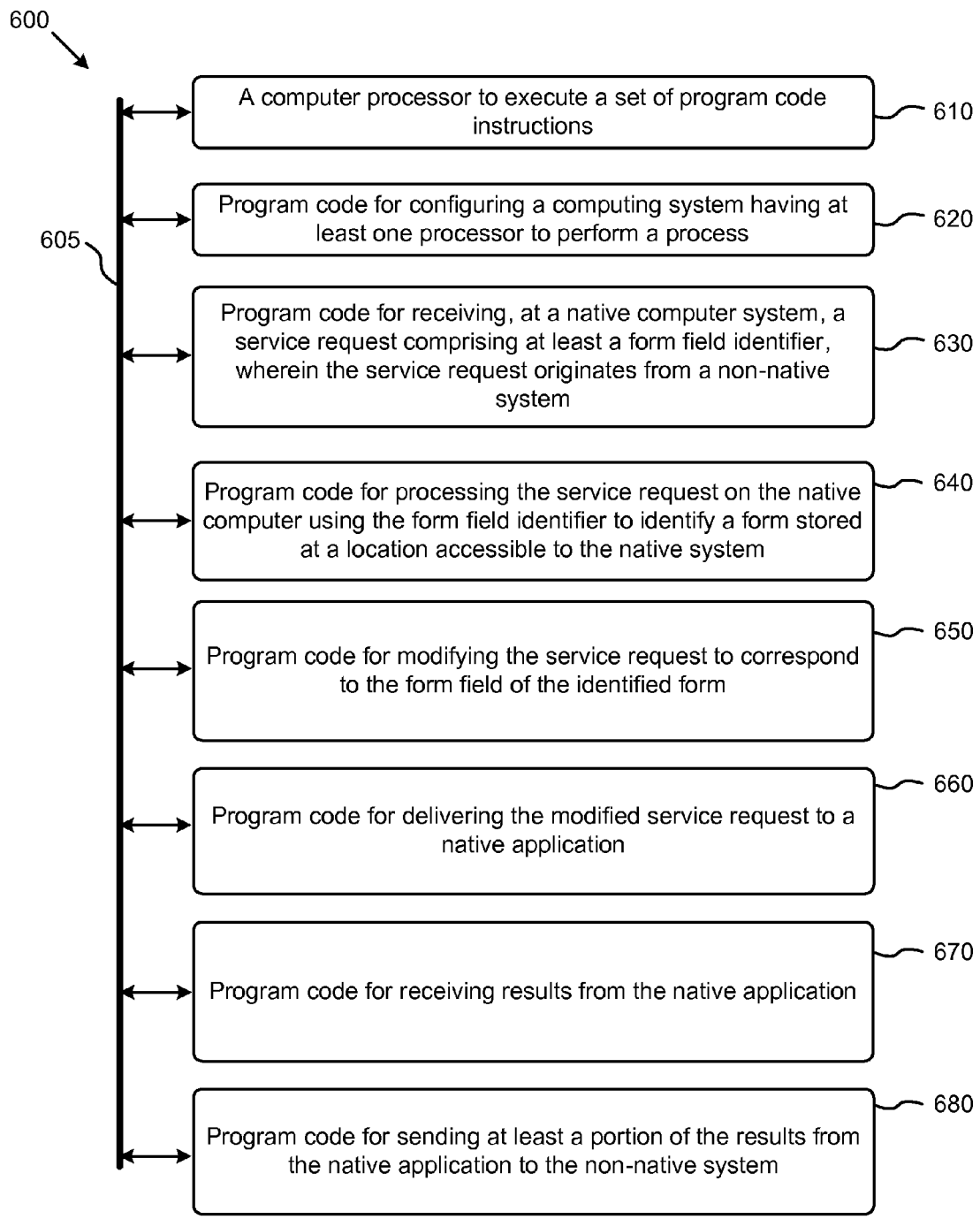
FIG. 6 is a block diagram of a system for accessing middleware application services from forms for accessing back-end business logic, according to some embodiments.

Additional Embodiments of The Disclosure
Additional Practical Application Examples FIG. 6 is a block diagram of a system for accessing middleware application services from forms for accessing back-end business logic, according to some embodiments. As an option, the present system 600 may be implemented in the context of the architecture and functionality of the embodiments described herein. Of course, however, the system 600 or any operation therein may be carried out in any desired environment.

As shown, system 600 comprises at least one processor and at least one memory, the memory serving to store program instructions corresponding to the operations of the system. An operation can be implemented in whole or in part using program instructions accessible by a module. The modules are connected to a communication path 605, and any operation can communicate with other operations over communication path 605. The modules of the system can, individually or in combination, perform method operations within system 600. Any operations performed within system 600 may be performed in any order unless as may be specified in the claims.

The embodiment of FIG. 6 implements a portion of a computer system, shown as system 600, comprising a computer processor to execute a set of program code instructions (see module 610) and modules for accessing memory to hold program code instructions to perform: configuring a computing system having at least one processor to perform a process (see module 620); receiving, at a native computer system, a service request comprising at least a form field identifier, wherein the service request originates from a non-native system (see module 630); processing the service request on the native computer using the form field identifier to identify a form stored at a location accessible to the native system (see module 640); modifying the service request to correspond to the form field of the identified form (see module 650); delivering the modified service request to a native application (see module 660); receiving results from the native application (see module 670); and sending at least a portion of the results from the native application to the non-native system (see module 680). The aforementioned modification operations can comprise modifying the service request as originated from the non-native system in the form of a URI post, and reformatting the received URI post to so as to comport with a format or formats that are used by the native application.

System Architecture Overview
Additional System Architecture Examples

Figure 7:
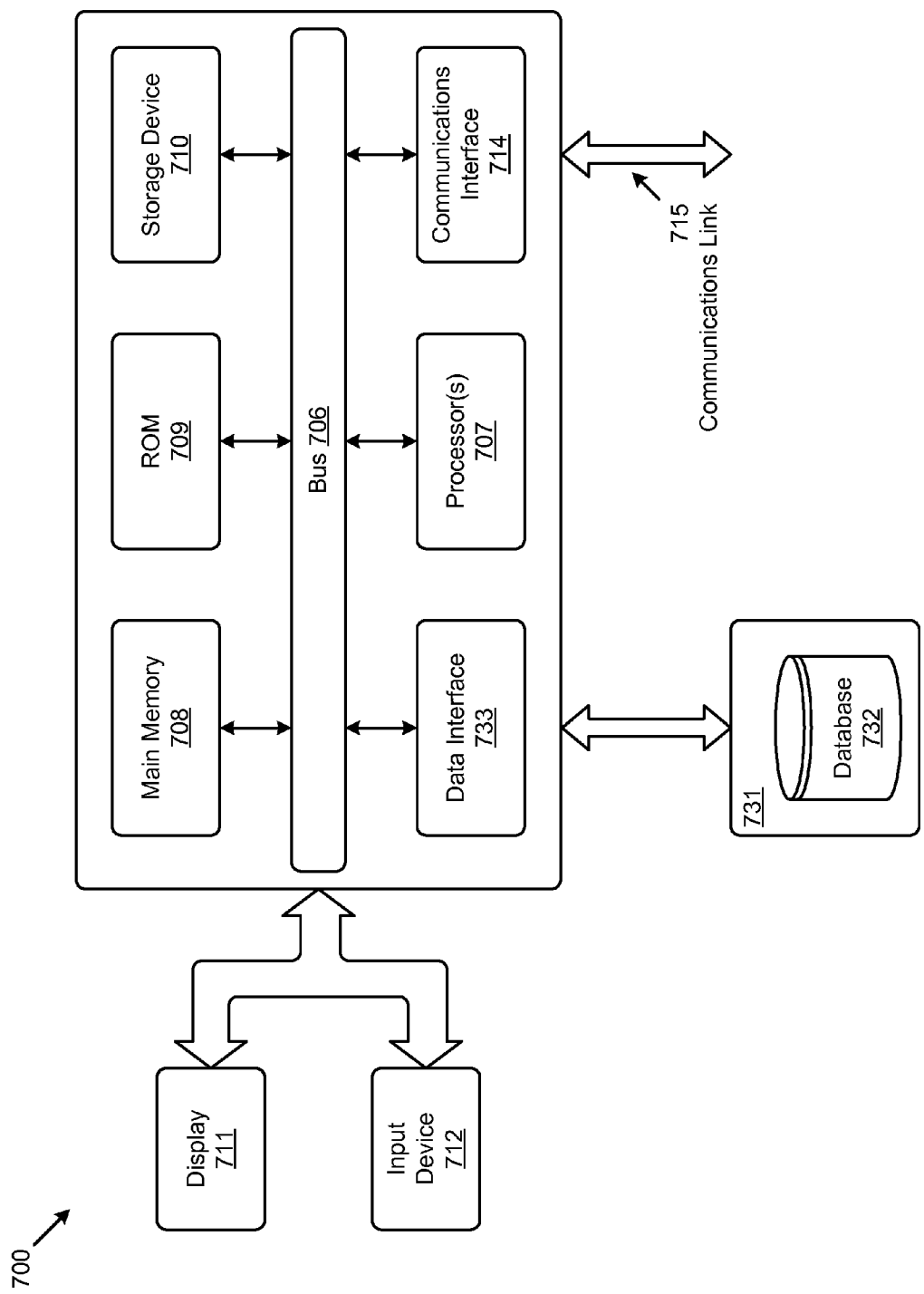
FIG. 7 depicts a block diagram of an instance of a computer system suitable for implementing an embodiment of the present disclosure.

FIG. 7 depicts a block diagram of an instance of a computer system 700 suitable for implementing an embodiment of the present disclosure. Computer system 700 includes a bus 706 or other communication mechanism for communicating information, which interconnects subsystems and devices, such as a processor 707, a system memory 708 (e.g., RAM), a static storage device (e.g., ROM 709), a disk drive 710 (e.g., magnetic or optical), a data interface 733, a communication interface 714 (e.g., modem or Ethernet card), a display 711 (e.g., CRT or LCD), input devices 712 (e.g., keyboard, cursor control), and an external data repository 731.

According to one embodiment of the disclosure, computer system 700 performs specific operations by processor 707 executing one or more sequences of one or more instructions contained in system memory 708. Such instructions may be read into system memory 708 from another computer readable/usable medium, such as a static storage device or a disk drive 710. In alternative embodiments, hard-wired circuitry may be used in place of or in combination with software instructions to implement the disclosure. Thus, embodiments of the disclosure are not limited to any specific combination of hardware circuitry and/or software. In one embodiment, the term "logic" shall mean any combination of software or hardware that is used to implement all or part of the disclosure.

The term "computer readable medium" or "computer usable medium" as used herein refers to any medium that participates in providing instructions to processor 707 for execution. Such a medium may take many forms, including but not limited to, non-volatile media and volatile media. Non-volatile media includes, for example, optical or magnetic disks, such as disk drive 710. Volatile media includes dynamic memory, such as system memory 708.

Common forms of computer readable media includes, for example, floppy disk, flexible disk, hard disk, magnetic tape, or any other magnetic medium; CD-ROM or any other optical medium; punch cards, paper tape, or any other physical medium with patterns of holes; RAM, PROM, EPROM, FLASH-EPROM, or any other memory chip or cartridge, or any other non-transitory medium from which a computer can read data.

In an embodiment of the disclosure, execution of the sequences of instructions to practice the disclosure is performed by a single instance of the computer system 700. According to certain embodiments of the disclosure, two or more computer systems 700 coupled by a communications link 715 (e.g., LAN, PTSN, or wireless network) may perform the sequence of instructions required to practice the disclosure in coordination with one another.

Computer system 700 may transmit and receive messages, data, and instructions, including programs (e.g., application code), through communications link 715 and communication interface 714. Received program code may be executed by processor 707 as it is received, and/or stored in disk drive 710 or other non-volatile storage for later execution. Computer system 700 may communicate through a data interface 733 to a database 732 on an external data repository 731. A module as used herein can be implemented using any mix of any portions of the system memory 708, and any extent of hard-wired circuitry including hard-wired circuitry embodied as a processor 707.

In the foregoing specification, the disclosure has been described with reference to specific embodiments thereof. It will, however, be evident that various modifications and changes may be made thereto without departing from the broader spirit and scope of the disclosure. For example, the above-described process flows are described with reference to a particular ordering of process actions. However, the ordering of many of the described process actions may be changed without affecting the scope or operation of the disclosure. The specification and drawings are, accordingly, to be regarded in an illustrative sense rather than in a restrictive sense.

What is claimed is:
1. A method comprising:
receiving, by a native computer system, a service request comprising at least one form field identifier and form data for forms processing, wherein
the service request originates from a non-native computer system as an access request for a native application that resides on the native computer system;
identifying a form that corresponds to the form data and is stored at a location accessible by the native system by using at least the at least one form field identifier;
delivering the service request to the native application that is configured to perform one or more operations of form processing on at least a portion of the form for the forms processing;
performing the one or more operations for the forms processing within the native application to produce results from the native application;
sending at least a portion of the results from the native application to the non-native system using the at least one form field identifier
identifying, at the non-native computer system, a specification of a user request comprising a form data payload to access the native application hosted by the native computer system for the form;

receiving, at the non-native computer system from a user, user provided data in the form that is pre-existing on and provided by the native computer system;

receiving, at the non-native computer system, a user credential from the user;

receiving, at the non-native computer system, an identifier of the native application from the user;

receiving, at the non-native computer system, a version of the native application from the user;

receiving, at the non-native computer system, a form identifier of the form from the user;

receiving, at the non-native computer system, one or more references to the one or more operations to be performed on the form from the user;

receiving, at an intermediate computer system comprising at least one form processor, the service request from the non-native computer system;

transmitting the user provided data, the user credential, the identifier, the version, and the one or more references from the non-native computer system to the native computer system via a network communication channel;

prior to sending the service request to the native computer system, processing the service request at the at least one form processor of the intermediate computer system;

configuring a request emulator remote from the non-native computer system to include a security interface, which is configured to pass parameters to at least one field in the form, and data and capability of handling a plurality of protocols that are implemented on the intermediate computer system;

receiving, at a request emulator remote from the non-native computer system, the service request from a service proxy that has been processed by the at least one form processor and resides at the intermediate computer system;

modifying, at the request emulator, the service request into a modified service request that comprises information about the at least one form field identifier based in part or in whole upon at least one requirement of the native application residing on the native computer system;

communicating, at the native application, the modified service request with a database engine that comprises a plurality of forms and form metadata that correspond to respective form components in the form and describe a structure of the form and a plurality of components of the form;

identifying, at the database engine, the form on which the one or more operations are to be performed and one or more fields in the form with the information about the at least one form field identifier;

executing, at the native computer system using the form metadata and data received from the user, the native application in a silent mode or a headless mode where the one or more operations are performed on the form as if the user had requested the one or more operations from the native computer system;

receiving, at the native computer system, the one or more references to the one or more operations to be performed on the form;

initiating, at the native computer system, the one or more operations;

raising a post event at least by initiating a post dialog after initiating the one or more operations at the native computer system;

executing post-operation logic to obtain additional user provided data that satisfy operation requirements for the one or more operations;

generating, at the native application, the results at least by performing the one or more operations on the form;

executing the post-operation logic to provide for data filter and formatting that comports to non-native computer system requirements for the non-native computer system to receive the at least a portion of the results from the native application;

transmitting the at least the portion of the results generated by the native application to the request emulator;

processing, at the request emulator, the at least the portion of the results into one or more messages; and transmitting the one or more messages from the request emulator to the non-native computer system while enabling a backend computer system to perform one or more CRUD (create, read, update, and delete) operations on the native computer system that is remotely connected to the non-native computer system.

2. The method of claim 1 further comprising sending the at least the portion of the results from a middleware component to the non-native system, and processing the service request within the middleware component that is stored at least partially in memory and functions in tandem with at least one microprocessor, wherein the at least one form field identifier is mapped to an operation of the native application, and the non-native system is at least one of, a mobile device, a smart phone, and a tablet.

3. The method of claim 1, further comprising a middleware component that includes a form service request processor.

4. The method of claim 1, wherein sending the results from the native application to the non-native system uses a JSON message.

5. The method of claim 1, wherein the at least one form field identifier received from the non-native system serves to uniquely identify a particular form that is processed by an application running on the native system.

6. The method of claim 1, wherein the at least one form field identifier uniquely identifies the form.

7. The method of claim 1, further comprising delivering the service request to an application server that hosts the native application that is configured to process the service request that includes the at least one form field identifier.

8. A computer program product embodied in a non-transitory computer readable medium, the non-transitory computer readable medium having stored thereon a sequence of instructions which, when executed by a processor, causes the processor to execute a set of acts, the set of acts comprising:

receiving, by a native computer system, a service request comprising at least one form field identifier and form data for forms processing, wherein
the service request originates from a non-native computer system as an access request for a native application that resides on the native computer system;

identifying a form that corresponds to the form data and is stored at a location accessible by the native computer system by using at least the at least one form field identifier;

delivering the service request to the native application that is configured to perform one or more operations on at least a portion of the form for the forms processing;

performing the one or more operations for the forms processing within the native application to produce results from the native application;

sending at least a portion of the results from the native application to the non-native system using the at least one form field identifier;

identifying, at the non-native computer system, a specification of a user request comprising a form data payload to access the native application hosted by the native computer system for the form;

receiving, at the non-native computer system from a user, user provided data in the form that is pre-existing on and provided by the native computer system;

receiving, at the non-native computer system, a user credential from the user;

receiving, at the non-native computer system, an identifier of the native application from the user;

receiving, at the non-native computer system, a version of the native application from the user;

receiving, at the non-native computer system, a form identifier of the form from the user;

receiving, at the non-native computer system, one or more references to the one or more operations to be performed on the form from the user;

receiving, at an intermediate computer system comprising at least one form processor, the service request from the non-native computer system;

transmitting the user provided data, the user credential, the identifier, the version, and the one or more references from the non-native computer system to the native computer system via a network communication channel;

prior to sending the service request to the native computer system, processing the service request at the at least one form processor of the intermediate computer system;

configuring a request emulator remote from the non-native computer system to include a security interface, which is configured to pass parameters to at least one field in the form, and data and capability of handling a plurality of protocols that are implemented on the intermediate computer system;

receiving, at a request emulator remote from the non-native computer system, the service request from a service proxy that has been processed by the at least one form processor and resides at the intermediate computer system;

modifying, at the request emulator, the service request into a modified service request that comprises information about the at least one form field identifier based in part or in whole upon at least one requirement of the native application residing on the native computer system;

communicating, at the native application, the modified service request with a database engine that comprises a plurality of forms and form metadata that correspond to respective form components in the form and describe a structure of the form and a plurality of components of the form;

identifying, at the database engine, the form on which the one or more operations are to be performed and one or more fields in the form with the information about the at least one form field identifier;

executing, at the native computer system using the form metadata and data received from the user, the native application in a silent mode or a headless mode where the one or more operations are performed on the form as if the user had requested the one or more operations from the native computer system;

receiving, at the native computer system, the one or more references to the one or more operations to be performed on the form;

initiating, at the native computer system, the one or more operations;

raising a post event at least by initiating a post dialog after initiating the one or more operations at the native computer system;

executing post-operation logic to obtain additional user provided data that satisfy operation requirements for the one or more operations;

generating, at the native application, the results at least by performing the one or more operations on the form;

executing the post-operation logic to provide for data filter and formatting that comports to non-native computer system requirements for the non-native computer system to receive the at least a portion of the results from the native application;

transmitting the at least the portion of the results generated by the native application to the request emulator;

processing, at the request emulator, the at least the portion of the results into one or more messages; and transmitting the one or more messages from the request emulator to the non-native computer system while enabling a backend computer system to perform one or more CRUD (create, read, update, and delete) operations on the native computer system that is remotely connected to the non-native computer system.

9. The computer program product of claim 8, wherein the at least one form field identifier is mapped to an operation of the native application.

10. The computer program product of claim 8, wherein the non-native system comprises at least one of, a mobile device, a smart phone, and a tablet.

11. The computer program product of claim 8, further comprising instructions for processing the service request within a middleware component.

12. The computer program product of claim 11 further comprising instructions for sending at least a portion of the results from the middleware component to the non-native system.

13. The computer program product of claim 11, wherein the middleware component includes a form service request processor.

14. The computer program product of claim 8, wherein the at least one form field identifier received from the non-native system serves to uniquely identify a particular form that is processed by an application running on the native system.

15. The computer program product of claim 8, further comprising delivering the service request to an application server that hosts the native application that is configured to process the identified form.

16. A computer system comprising:
a receiving unit, which is stored at least partially within memory of a native computer system and functions in tandem with at least one microprocessor, configured to receive a service request comprising at least one form field identifier and form data for forms processing, wherein
the service request originates from a non-native system as an access request for a native application that resides on the native computer system, and
the native computer system is further configured to identify a form that corresponds to the form data and is stored at a location accessible by the native computer system by using at least the at least one form field identifier;

a middleware component, which is stored at least partially in memory and functions in tandem with at least one microprocessor, configured to deliver the service request to the native application that is configured to perform one or more operations on at least a portion of the form for the forms processing;

a native application module comprising the native application and being configured to perform one or more operations of forms processing within the native application to produce results from the native application, wherein the native application module sends at least a portion of the results from the native application to the non-native system using the at least one form field identifier, wherein the computer system is further configured to:

identify, at the non-native computer system, a specification of a user request comprising a form data payload to access the native application hosted by the native computer system for the form;

receive, at the non-native computer system from a user, user provided data in the form that is pre-existing on and provided by the native computer system;

receive, at the non-native computer system, a user credential from the user;

receive, at the non-native computer system, an identifier of the native application from the user;

receive, at the non-native computer system, a version of the native application from the user;

receive, at the non-native computer system, a form identifier of the form from the user;

receive, at the non-native computer system, one or more references to the one or more operations to be performed on the form from the user;

receive, at an intermediate computer system comprising at least one form processor, the service request from the non-native computer system;

transmit the user provided data, the user credential, the identifier, the version, and the one or more references from the non-native computer system to the native computer system via a network communication channel;

prior to sending the service request to the native computer system, process the service request at the at least one form processor of the intermediate computer system;

configure a request emulator remote from the non-native computer system to include a security interface, which is configured to pass parameters to at least one field in the form, and data and capability of handling a plurality of protocols that are implemented on the intermediate computer system;

receive, at a request emulator remote from the non-native computer system, the service request from a service proxy that has been processed by the at least one form processor and resides at the intermediate computer system;

modify, at the request emulator, the service request into a modified service request that comprises information about the at least one form field identifier based in part or in whole upon at least one requirement of the native application residing on the native computer system;

communicate, at the native application, the modified service request with a database engine that comprises a plurality of forms and form metadata that correspond to respective form components in the form and describe a structure of the form and a plurality of components of the form;

identify, at the database engine, the form on which the one or more operations are to be performed and one or more fields in the form with the information about the at least one form field identifier;

execute, at the native computer system using the form metadata and data received from the user, the native application in a silent mode or a headless mode where the one or more operations are performed on the form as if the user had requested the one or more operations from the native computer system;

receive, at the native computer system, the one or more references to the one or more operations to be performed on the form;

initiate, at the native computer system, the one or more operations;

raise a post event at least by initiating a post dialog after initiating the one or more operations at the native computer system;

execute post-operation logic to obtain additional user provided data that satisfy operation requirements for the one or more operations;

generate, at the native application, the results at least by performing the one or more operations on the form;

execute the post-operation logic to provide for data filter and formatting that comports to non-native computer system requirements for the non-native computer system to receive the at least a portion of the results from the native application;

transmit the at least the portion of the results generated by the native application to the request emulator;

process, at the request emulator, the at least the portion of the results into one or more messages; and transmit the one or more messages from the request emulator to the non-native computer system while enabling a backend computer system to perform one or more CRUD (create, read, update, and delete) operations on the native computer system that is remotely connected to the non-native computer system.

17. The computer system of claim 16, wherein the at least one form field identifier is mapped to an operation of the native application.

18. The computer program product of claim 8, wherein the non-transitory computer readable medium further stores thereupon the sequence of instructions which, when executed by the processor, causes the processor to execute the set of acts, and the set of acts further comprises sending the at least the portion of the results from a middleware component to the non-native system, and processing the service request within the middleware component that is stored at least partially in memory and functions in tandem with at least one microprocessor, wherein the at least one form field identifier is mapped to an operation of the native application, and the non-native system is at least one of, a mobile device, a smart phone, and a tablet.

19. The computer system of claim 16, wherein the computer system is further configured to send the at least the portion of the results from a middleware component to the non-native system, and processing the service request within the middleware component that is stored at least partially in memory and functions in tandem with at least one microprocessor, wherein the at least one form field identifier is mapped to an operation of the native application, and the non-native system is at least one of, a mobile device, a smart phone, and a tablet.

20. The computer system of claim 16, wherein the computer system is further configured to deliver the service request to an application server that hosts the native application that is configured to process the service request that includes the at least one form field identifier.

* * * * *

UNITED STATES PATENT AND TRADEMARK OFFICE
CERTIFICATE OF CORRECTION

PATENT NO. : 9,858,321 B2  
APPLICATION NO. : 14/463532  
DATED : January 2, 2018  
INVENTOR(S) : Shakespeare et al.

Page 1 of 1

It is certified that error appears in the above-identified patent and that said Letters Patent is hereby corrected as shown below:

In the Specification

Column 1, Line 9, delete "SYSTEM" ," and insert -- SYSTEM", --, therefor.

Column 1, Lines 12-13, delete "CODE" ," and insert -- CODE", --, therefor.

Column 1, Line 18, delete "CODE" ," and insert -- CODE", --, therefor.

Column 8, Line 10, delete "XML," and insert -- XML --, therefor.

Column 8, Line 33, delete "14/179,548 ," and insert -- 14/179,548, --, therefor.

Column 10, Line 17, delete "PTSN," and insert -- PSTN, --, therefor.

Signed and Sealed this  
Seventeenth Day of July, 2018

Andrei Iancu  
*Director of the United States Patent and Trademark Office*